(12) United States Patent
Holemans

(10) Patent No.: US 6,780,488 B2
(45) Date of Patent: Aug. 24, 2004

(54) LIQUID MOLDED HOLLOW CELL CORE COMPOSITE ARTICLES

(75) Inventor: Peter Holemans, Sewell, NJ (US)

(73) Assignee: The Boeing Company, Chicago, IL (US)

( * ) Notice: Subject to any disclaimer, the term of this patent is extended or adjusted under 35 U.S.C. 154(b) by 10 days.

(21) Appl. No.: 10/012,664

(22) Filed: Oct. 30, 2001

(65) Prior Publication Data

US 2004/0086686 A1 May 6, 2004

(51) Int. Cl.⁷ .................................................. B32B 3/12
(52) U.S. Cl. ........................ 428/73; 428/116; 428/71; 428/76; 428/343; 428/354; 156/242; 156/245; 156/290; 156/307.1; 156/307.5; 156/325; 156/330
(58) Field of Search .............................. 428/116, 73, 71, 428/76, 343, 354; 156/60, 242, 245, 290, 307.1, 307.5, 325, 330

(56) References Cited

U.S. PATENT DOCUMENTS

| | | | |
|---|---|---|---|
| 4,957,797 A | * | 9/1990 | Maeda et al. |
| 4,973,506 A | * | 11/1990 | Bauer et al. |
| 5,238,725 A | * | 8/1993 | Effing et al. |
| 5,316,604 A | * | 5/1994 | Fell |
| 5,484,500 A | * | 1/1996 | Kaufmann et al. |
| 5,567,499 A | | 10/1996 | Cundiff et al. |
| 5,569,508 A | | 10/1996 | Cundiff |
| 5,649,721 A | * | 7/1997 | Stafford et al. |
| 5,851,336 A | | 12/1998 | Cundiff et al. |
| 6,156,146 A | | 12/2000 | Cundiff |
| 2002/0069962 A1 | * | 6/2002 | Maxwell et al. |

* cited by examiner

Primary Examiner—Deborah Jones
Assistant Examiner—Wendy Boss

(57) ABSTRACT

A hollow core composite assembly 10 is provided, including a hollow core base 12 having an open core surface 14, a polyetherketoneketone film 22 applied to the hollow core base 12, and an adhesive layer 24 positioned between the polyetherketoneketone film 22 and the open core surface 14. The resultant hollow core composite assembly 10 can be cured to provide a structure suitable for use within a liquid molding process.

24 Claims, 3 Drawing Sheets

LIQUID MOLDED HOLLOW CELL CORE COMPOSITE ARTICLES

CROSS-REFERENCE TO RELATED APPLICATIONS

This is one of two related applications being filed on the same day. The second is entitled Liquid Molded Hollow Cell Core Composite Articles filed on Oct. 30, 2001, Ser. No. 10/021,153 (01-194/009873 BOE 0279 PA).

TECHNICAL FIELD

The present invention relates generally to hollow cell core composite articles and more particularly to a liquid molded honeycomb core composite articles.

BACKGROUND OF THE INVENTION

The cornerstone of aeronautics, avionics, and spacecraft design has been the ability to design lightweight components that maintain structural strength and integrity. These characteristics play a crucial role not only in traditional design considerations such as flight capabilities and structural integrity, but also play a crucial role in the adaptability and commercial performance of a given craft design. Reduced weight and structural fortitude can play a significant role in fuel consumption, craft profile, and cargo and/or passenger capacity. The increase in profitability associated with the aforementioned factors, as well as a variety of others, has provided strong motivation for design advancements in the area of strength/weight improvement.

A significant advancement in the development of low weight/high strength structures was the development of the hollow cell cores, such as honeycomb cores. Hollow cell cores provide a high strength structural base while minimizing the negative effects of the weight associated with the core material by containing voids within the core material that provide for significant weight savings as compared to a solid component. The high strength/low weight characteristic of hollow cell cores has therefore resulted in the popularity of their use within the aeronautics industry as well as a variety of other industries.

Despite the popularity of hollow cell core materials, such as honeycomb cores, there use has not been suitable for certain manufacturing processes. Liquid molding processes, for example, can present problems when applied to hollow cell core materials. Liquid molding composite manufacturing processes, such as resin transfer molding, vacuum assisted resin infusion, vacuum infusion molding, and others, present fundamental concerns for the use of hollow cell core materials. When these processes are used, it is possible for the hollow cells to fill with liquid resin prior to curing. This can make the resulting structure resin rich, heavy, and generally undesirable. It would be highly desirable to have the ability to apply liquid molding approaches to hollow cell core materials without the concerns for compromised cells.

Numerous approaches have been developed in an attempt to solve the hollow cell core/liquid molding dilemma. Often, however, the resulting solutions add undesirable weight and/or production costs to the resulting hollow core composite articles. One solution pre-processes the core to seal the cells with film adhesive, or film adhesive and prepreg, prior to liquid molding composite article fabrication to prevent liquid molding resin from penetrating the cells. Other processes include filling the hollow cells, for example, with a closed cell foam or material. This, however, often adds undesirable weight to the resulting article. Precured composite sheets autoclaved to the hollow cell core add additional weight and require a costly autoclaving process. Although a variety of other attempts are known to seal the hollow cell core, often these attempts result in undesirable weight increases, increases in the number of processing steps, and undesirable cost increases.

It would, therefore, be highly desirable to have a method for sealing hollow cell core material such that the hollow cell core material may be successfully used with known liquid molding approaches without penetration of the hollow cells by the liquid molding. In addition, it would be highly desirable for such a protective hollow cell core material to withstand liquid molding approaches without undesirable increases in weight or the requirement for costly manufacturing processes.

SUMMARY OF THE INVENTION

It is, therefore, an object of the present invention to provide a liquid molded hollow core composite assembly for use in low weight/high strength articles. It is a further object of the present invention to provide a liquid molded hollow core composite assembly that can be manufactured without resulting in undesirable increases in composite assembly weight or manufacturing time and cost.

In accordance with those and other objects of the present invention, a hollow core composite assembly is provided. The hollow core composite assembly includes a hollow core base having at least one open core surface. The hollow core composite assembly further includes a polyetherketoneketone film applied to the open core surface. At least one adhesive film is positioned between the open core surface and the polyetherketoneketone film to bond the surfaces together. The resultant hollow core composite assembly is then suitable for use in liquid molding processes such as resin transfer molding or resin infusion processes.

Other objects and features of the present invention will become apparent when viewed in light of the detailed description of the preferred embodiment when taken in conjunction with the attached drawings and appended claims.

DESCRIPTION OF THE PREFERRED EMBODIMENT(S)

Figure 1:
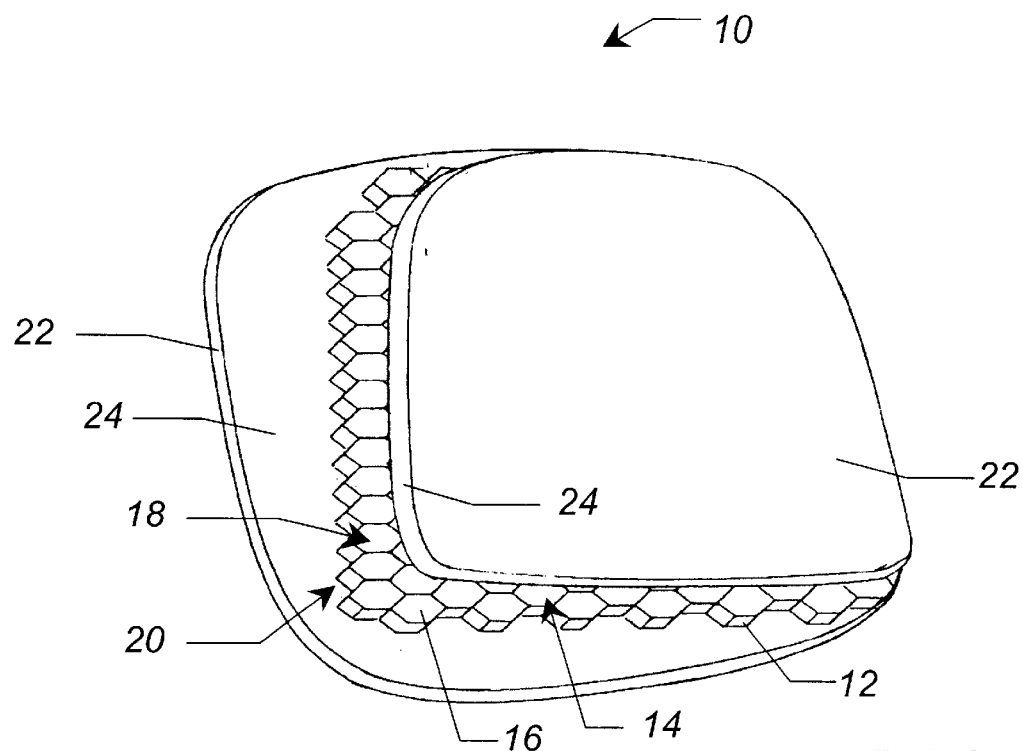
FIG. 1 is an exploded view illustration of an embodiment of a hollow core composite assembly in accordance with the present invention.

Referring now to FIG. 1, which is an illustration of an embodiment of a hollow core composite assembly 10 in accordance with the present invention. The hollow core composite assembly 10 is intended for use within the aeronautics and spacecraft industry, although it is contemplated that the present invention may be utilized within a wide variety of fields. The hollow core composite assembly 10 provides a lightweight and cost effective method of providing structural assemblies for use in aircraft and spacecraft design.

The hollow core composite assembly 10 includes a hollow core base 12. A wide variety of hollow core base 12 embodiments are known within the prior art. One such embodiment is a honeycomb core. The advantage of hollow core bases 12 is that they provide a low weight/high strength structure popular within the aeronautics field. A traditional disadvantage to such hollow core bases 12 is that they commonly contain at least one open core surface 14 where the hollow cores 16 are exposed. This open core surface 14 provides access to the hollow cores 16 and can provide a mechanism for liquid resin from the resin transfer molding process or vacuum assisted resin transfer molding process, to penetrate the hollow core base 12 and thereby suffer losses to its weight benefits. Although it is possible for a hollow core base 12 to have a single open core surface 14, commonly a hollow core base 12 will have an upper open core surface 18 and a lower open core surface 20.

The present invention seals and protects the open core surfaces 14 through the use of a bondable solid film 22 applied to the open cores surfaces 14. A variety of bondable solid films 22 are contemplated by the present invention. One embodiment contemplates the use of a polysulphone (PSU) film. Other embodiments include, but are not limited to, bondable solid films 22 such as forms of, polyethyleneterephthalate (PET), nylon, thermoplastic polymer materials, metal foils, thermoset film materials, and urethane film materials. The primary characteristic of the solid bondable film 22 is to be impervious to penetration of the liquid resin of choice in the composite liquid molding process (such as vinyl ester, polyester epoxies, phenolids, cynate esters, etc.) and bondable to the hollow core base 12 with or without the addition of an adhesive. The solid bondable film 22 provides a barrier to prevent subsequent liquid molding materials from penetrating the hollow cores 16 and thereby compromising the integrity of the hollow core composite assembly 10.

One novel embodiment contemplates the use of polyetherketoneketone (PEKK) as the solid bondable film 22. The use of PEKK provides a variety of advantages over many films when the hollow core composite assembly 10 is for use in unique applications. One advantage, is that the PEKK film has a relatively low dielectric constant. This can be an important factor when the hollow core composite assembly 10 is intended for use within low observable aircraft. The low dielectric constant can be advantageous to designs wherein low radar profile or radar invisibility is desired. The use of PEKK also provides the advantage of providing a solid bondable film 22 with improved bonding characteristics over many solid films. This can improve and simplify the manufacturing process as well as improve the integrity of the resulting composite. Although the PEKK film 22 may be formed in a variety of dimensions, one embodiment contemplates the use of a 1.1 millimeter film.

The hollow core composite assembly 10 can further include an adhesive layer 24 positioned between the solid bondable film 22 and the open core surface 14. The adhesive layer 24, such as an adhesive film, can be utilized to assist the bonding of the solid bondable film 22 to the hollow core base 12. Although a variety of adhesive layers 24 are contemplated, one embodiment contemplates the use of FM300 film adhesive. Other contemplated adhesives 24 include, but are not limited to, thermoplastic adhesive, hot melt adhesive, epoxy paste, BMI paste, and cyanate ester paste adhesives. It is envisioned that the solid bondable film 22 and the adhesive layer 24 are attached to the hollow core composite assembly 10 as part of the composite article perform. The thermal cycle to enhance the bonding characteristic of the solid bondable film 22 to the open core surface 14 (with or without the presence of the adhesive layer 24) can be included in the single processing cycle for the hollow core composite assembly 10 and thereby lower processing costs and cycle time. It should be understood, however, that the solid bondable film 22 may be bonded to the hollow core base 12 prior to the composite article processing cycle as a separate processing step such as pre-curing. Pre-curing refers to curing the chemically active material of a detail/subassembly prior to a future cure of a more complete assembly. In one embodiment of the present invention, the hollow core base 12 and bondable solid film 22 can be "pre-cured" prior to a liquid molding operation. During a liquid molding operation the injectioned or infused resin would then be cured.

Figure 2:
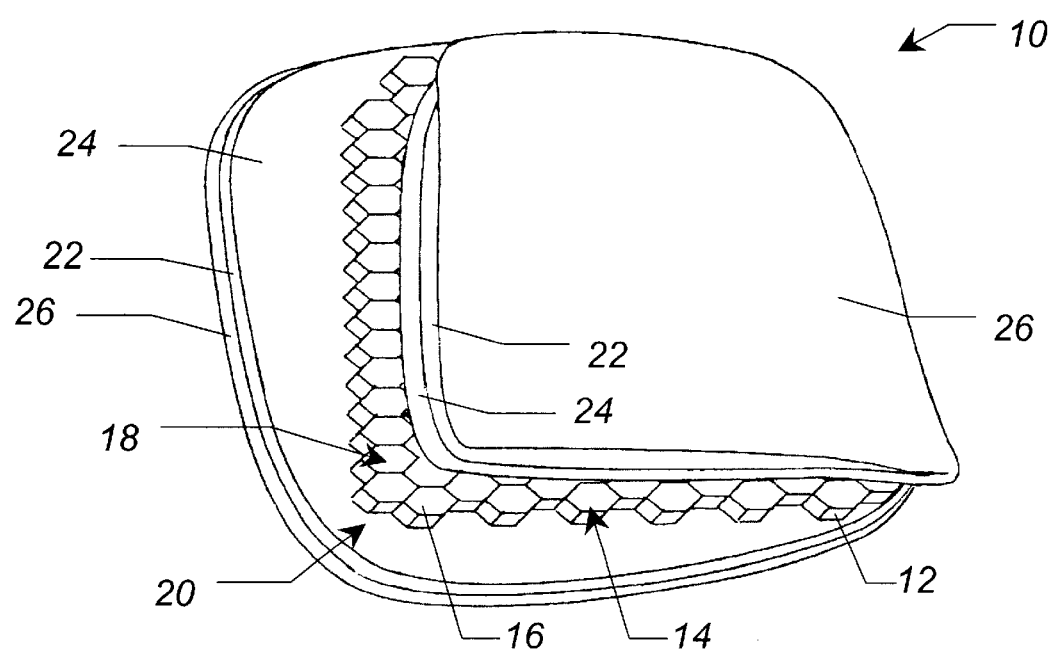
FIG. 2 is an exploded view of an alternate embodiment of a hollow core composite assembly in accordance with the present invention.

In an alternate novel embodiment, illustrated in FIG. 2, the present invention can further include at least one outer adhesive film 26 applied to the outer surface 28 of the solid bondable film 22. A distinct and novel aspect of this embodiment, is that it can assist in improving the bondable outer surface 28 of the solid bondable film 22 in order to ensure an improved hollow core composite assembly 10 when subjected to liquid molding techniques. Prior processes often required specialized surface preparation or coatings to insure that the liquid molding techniques securely bonded to the hollow core composite assembly 10. These specialized preparations could undesirably increase the cost, process steps, and time of manufacture. The present embodiment provides a relatively quick and efficient way of improving the bondable outer surface 28 of the solid bondable film 22 without the need for expensive and time consuming processes. It may also serve to increase the range of solid bondable films 22 available for a given application.

Figure 3:
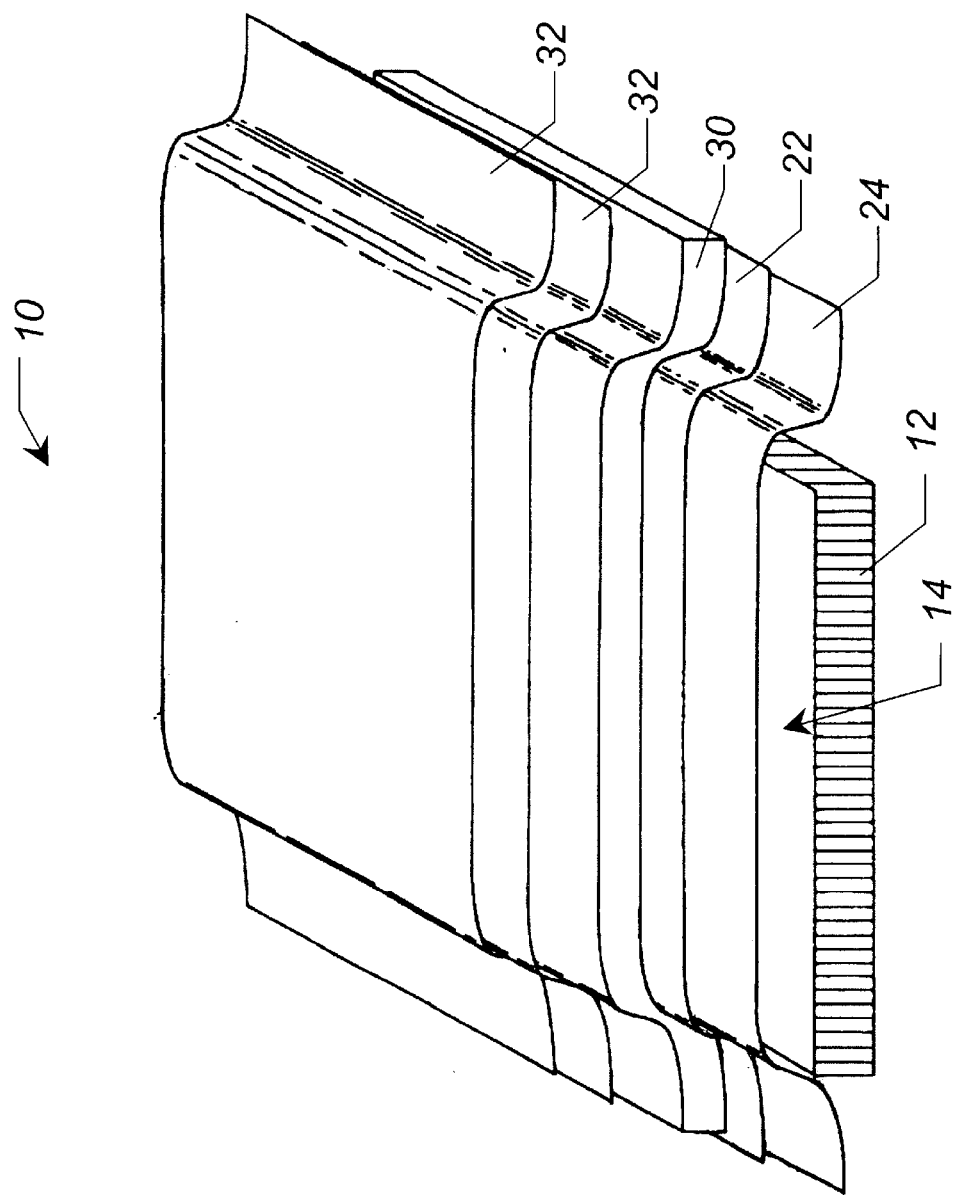
FIG. 3 is an exploded view of an alternate embodiment of a hollow core composite assembly in accordance with the present invention.

Referring now to FIG. 3, the present invention can further include at least one dry face ply 30 laid up dry and placed on top of the solid bondable film 22. Although a single dry face ply 30 can be used, it is contemplated that a plurality of dry face plies 30 are to be used to result in a composite sandwich panel of face skins. The face ply 30 (reinforcing ply, reinforcement, etc.) of the resulting composite article may consist of carbon fiber, fiberglass, Spectra, Kevlar fabric or other high performance reinforcement material. Although a single dry face ply 30 can be used, it is contemplated that low resin content or tackified ply could be used. This type of reinforcement material and style of reinforcement form (weave, mat, yarn or tow) is dependent on the design and function of the resulting composite article and may be infinitely tailored to meet the desired need. A wide variety of dry face plies 30 are well known in the industry and can be used in combination to provide structural surfaces with unique properties. One advantage of using a plurality of dry face plies 30 is that the hollow core composite assembly 10 can be quickly and simply assembled and a single liquid molding process and all of the subsequent thermal processing, bonding steps and resin infusion can be performed simultaneously. This provides significant production cost and time advantages over many prior art methods.

Finally, liquid resin 32 is applied to the dry face ply 30, or plies, and the hollow core composite assembly 10 is cured. The liquid resin 32 wets out the dry plies 30. A single liquid resin 32 may be applied, or a plurality of liquid resins 32 may be utilized. Once cured, the resulting assembly 10 becomes a sandwich panel of face skins surrounding a hollow core base 12. The liquid resin 32 is contemplated to be applied in any of a variety of known fashions. In one embodiment, it is contemplated that the liquid resin 32 is applied using a resin transfer molding process. In alternate embodiments, however, the liquid resin 32 can be applied using a variety of processes including, but not limited to, vacuum assisted resin transfer molding, vacuum infusion molding processes, etc. The liquid resin 32 may be applied to the composite article in a variety of means such as wet lay-up, resin transfer molding processes, SCRIMP, vacuum assisted resin transfer molding processes, vacuum infusion molding processes, etc. For each of the named processes, the liquid molding resin 32 is selected based on the process method, composite article end item requirements, composite article use and other factors. After the application of the liquid resin 32, the resin is allowed to set (or cure) to a rigid form permitting the composite article to be removed from the tool or mold. The method of cure is dependent upon the selected liquid resin 32. Many types of polyester resin commonly used in the marine industry cure at ambient temperatures (70 deg F.) in a given amount of time, while many aerospace grade structural epoxy resins cure at 350 deg F. Each type of resin has varying cure requirements. After removal of the composite article from the tool or mold, it may undergo a post cure to enhance the resin properties or the composite article.

Figure 4:
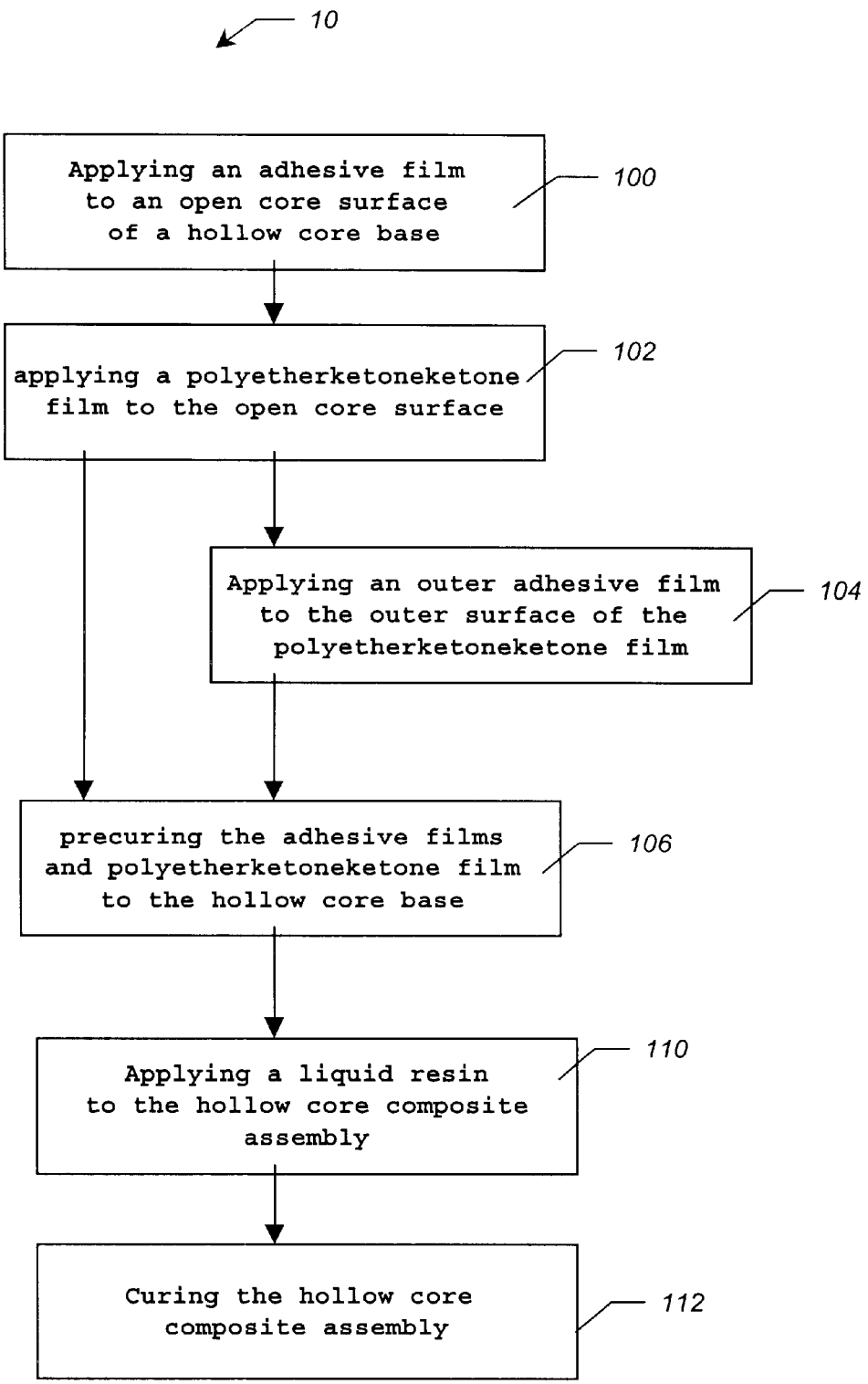
FIG. 4 is a flow-chart illustration of a method of producing a hollow core composite assembly in accordance with the present invention.

Referring now to FIG. 4, which is an embodiment of a method of producing a hollow core composite assembly in accordance with the present invention. The method includes applying an adhesive film to an open core surface of a hollow core base 100. The method further includes applying a polyetherketoneketone film to the open core surface 102. In an alternate embodiment, adhesive film may be applied directly to the polyetherketoneketone film and then applied to the open core surface. The method can optionally further include applying an outer adhesive film to the outer surface of the polyetherketoneketone film 104. In one embodiment, the method can include precuring the adhesive films and polyetherketoneketone film to the hollow core base 106. In other embodiments, however, the adhesive films and polyetherketoneketone films may be cured to the hollow core base as part of a resin application process. A liquid resin can then applied to the hollow core composite assembly 108. This may be accomplished in a single liquid resin application or may include a plurality of liquid resin applications. In addition, it is contemplated that the liquid resin may be applied in a variety of fashions including, but not limited to resin transfer molding and vacuum infusion molding processes. Finally, the hollow core composite assembly is cured 110. A variety of curing processes are contemplated by the present invention and may be used alone or in combination to effectuate curing base upon the curing requirements of the liquid resin, the adhesive film, and the hollow core base.

While particular embodiments of the invention have been shown and described, numerous variations and alternative embodiments will occur to those skilled in the art. Accordingly, it is intended that the invention be limited only in terms of the appended claims.

What is claimed is:

1. A hollow core composite assembly, comprising:
   a hollow core base including at least one open core surface;
   at least one polyetherketoneketone film affixed to said at least one open core surface;
   at least one adhesive layer positioned between said at least one open core surface and said at least one polyetherketoneketone film;
   at least one outer adhesive film applied to an outer surface of said at least one polyetherketoneketone film; and
   a liquid resin applied using a liquid molding process, said liquid resin applied over the hollow core base after said at least one adhesive layer and said at least one polyetherketoneketone film are applied to said hollow core base, said at least one polyetherketoneketone film preventing said liquid resin from penetrating said hollow core base.

2. A hollow core composite assembly 10 as described in claim 1, wherein said at least one adhesive layer 24 is an uncured adhesive film.

3. A hollow core composite assembly 10 as described in claim 1, wherein said at least one polyetherketoneketone film 22 and said at least one adhesive layer 24 are bonded to said hollow core base 12 using a pre-cure process.

4. A hollow core composite assembly 10 as described in claim 1, wherein said at least one polyetherketoneketone film 22 and said at least one adhesive layer 24 are bonded to said hollow core base 12 by curing as part of a resin application process.

5. A hollow core composite assembly as described in claim 1, wherein said at least one adhesive layer 24 is an epoxy paste adhesive.

6. A hollow core composite assembly 10 as described in claim 1, wherein said at least one adhesive layer 24 is cyanate ester paste adhesive.

7. A hollow core composite assembly 10 as described in claim 1, wherein said at least one adhesive layer 24 is thermoset adhesive.

8. A hollow core composite assembly 10 as described in claim 1, wherein said at least one adhesive layer 24 is a thermoplastic adhesive.

9. A hollow core composite assembly as described in claim 1, wherein said hollow core base is a honeycomb core.

10. A hollow core composite assembly comprising:
    a hollow core base including at least one open core surface;
    at least one polyetherketoneketone film affixed to said at least one open core surface;
    at least one adhesive layer positioned between said at least one open core surface and said at least one polyetherketoneketone film; and
    a liquid resin applied using a liquid molding process, said liquid resin applied over the hollow core base after said at least one adhesive layer and said at least one polyetherketoneketone film are applied to said hollow core base.

11. A hollow core composite assembly, comprising:
    a hollow core base including at least one open core surface;
    a solid film affixed to said at least one open core surface;
    at least one adhesive layer positioned between said at least one open core surface and said solid film;
    at least one outer adhesive film applied to an outer surface of said solid film; and
    a liquid resin applied using a liquid molding process over the hollow core base after said at least one adhesive layer, said solid film, and said at least one outer adhesive film are applied to said hollow core base.

12. A hollow core composite assembly 10 as described in claim 11, wherein said at least one adhesive layer 24 is an uncured adhesive film.

13. A hollow core composite assembly 10 as described in claim 11, wherein said solid film 22 and said at least one adhesive layer 24 are bonded to said hollow core base 12 by curing as part of a resin application process.

14. A hollow core composite assembly 10 as described in claim 11, wherein said at least one adhesive layer 24 is an epoxy paste adhesive.

15. A hollow core composite assembly 10 as described in claim 11, wherein said at least one adhesive layer 24 is a cyanate ester paste adhesive.

16. A hollow core composite assembly 10 as described in claim 11, wherein said at least one adhesive layer 24 is a hot melt adhesive.

17. A hollow core composite assembly 10 as described in claim 11, wherein said at least one adhesive layer 24 is a thermoplastic adhesive.

18. A hollow core composite assembly 10 as described in claim 11, wherein said at least one adhesive layer 24 is a BMI paste adhesive.

19. A hollow core composite assembly 10 as described in claim 11, wherein said at least one outer adhesive film 26 is an epoxy paste adhesive.

20. A hollow core composite assembly 10 as described in claim 11 wherein said hollow core base 12 is a honeycomb core.

21. A hollow core composite assembly 10 as described in claim 11 wherein said hollow core base 12 is an open cell foam.

22. A method of sealing a hollow core base for use in a liquid molding application process, comprising:

applying an uncured adhesive layer onto an open core surface of the hollow core base;

applying a polyetherketoneketone film onto said open core surface;

applying an outer adhesive film to an outer side of said polyetherkeytonketone film; and applying a liquid resin to said outer side, said polyetherkeytoneketone film preventing said liquid resin from penetrating into said open core surface.

23. A method of sealing a hollow core base for use in a liquid molding application process as described in claim 22, further comprising:

pre-curing said uncured adhesive layer and said polyetherketoneketone film to the hollow core base 106.

24. A method of sealing a hollow core base for use in a liquid molding application process as described in claim 22, further comprising:

curing said uncured adhesive layer and said polyetherketoneketone film to the hollow core base as part of the liquid molding application process 110.

* * * * *